US006964545B1

(12) United States Patent
Languasco

(10) Patent No.: US 6,964,545 B1
(45) Date of Patent: Nov. 15, 2005

(54) APPARATUS INCLUDING FLASH LIGHT AND BIT HOLDER FOR ATTACHMENT TO AN ELECTRIC DRILL

(76) Inventor: Ronald S. Languasco, 6909 Rista Way, Elk Grove, CA (US) 95758

( * ) Notice: Subject to any disclaimer, the term of this patent is extended or adjusted under 35 U.S.C. 154(b) by 187 days.

(21) Appl. No.: 10/402,077

(22) Filed: Mar. 27, 2003

(51) Int. Cl.[7] .......................... B23B 45/06; B65D 85/28

(52) U.S. Cl. .................... 408/16; 408/241 R; 362/119; 362/120; 206/372; 206/373; 206/379

(58) Field of Search .............................. 408/16, 241 R; 81/177.4, 490; 362/119, 120; 206/373, 379, 206/477, 480, 483; D8/70

(56) References Cited

U.S. PATENT DOCUMENTS

| | | | | | |
|---|---|---|---|---|---|
| 4,508,221 | A | * | 4/1985 | Olson | 206/379 |
| 4,797,040 | A | * | 1/1989 | Hibbard | 408/241 R |
| 4,973,205 | A | * | 11/1990 | Spaulding | 408/16 |
| 5,056,661 | A | * | 10/1991 | Balzano | 206/372 |
| 5,169,225 | A | | 12/1992 | Palm | |
| 5,445,479 | A | | 8/1995 | Hillinger | |
| D369,078 | S | * | 4/1996 | Anderson | D8/70 |
| 5,573,329 | A | * | 11/1996 | van Gennep | 362/191 |
| 5,683,171 | A | | 11/1997 | Van Gennep | |
| 5,797,670 | A | * | 8/1998 | Snoke et al. | 362/119 |
| 5,842,584 | A | * | 12/1998 | Baird | 211/69.1 |
| 6,186,638 | B1 | * | 2/2001 | Chang | 362/119 |
| 6,334,743 | B1 | * | 1/2002 | Liao | 408/16 |
| 6,364,580 | B1 | | 4/2002 | Dils et al. | |
| 6,401,253 | B2 | | 6/2002 | Brunson | |
| 6,502,949 | B1 | * | 1/2003 | Horiyama et al. | 362/119 |
| 6,565,227 | B1 | * | 5/2003 | Davis | 362/119 |
| 6,729,480 | B1 | * | 5/2004 | Blake | 211/70.6 |
| 6,729,743 | B2 | * | 5/2004 | Gillette | 362/191 |
| 2002/0054491 | A1 | * | 5/2002 | Casas | 362/119 |
| 2002/0105797 | A1 | * | 8/2002 | Navid et al. | 362/120 |
| 2003/0058637 | A1 | * | 3/2003 | Hsien | 362/119 |
| 2004/0055917 | A1 | * | 3/2004 | Stern | 206/373 |

* cited by examiner

*Primary Examiner*—Derris H. Banks
*Assistant Examiner*—Ali Abdelwahed
(74) *Attorney, Agent, or Firm*—Thomas R. Lampe

(57) ABSTRACT

Apparatus for releasable attachment to an electric drill housing includes a flexible base member, a bit holder and a flashlight. The positions of the bit holder and the flashlight are adjustable relative to the base member and a flashlight head of the flashlight can be adjusted relative to the flashlight body.

8 Claims, 2 Drawing Sheets

APPARATUS INCLUDING FLASH LIGHT AND BIT HOLDER FOR ATTACHMENT TO AN ELECTRIC DRILL

TECHNICAL FIELD

This invention relates to electric drills (both plug-in and cordless), and more particularly to apparatus employed with electric drills to direct light to an object being drilled and to releasably retain bits, such as screw bits and drill bits.

BACKGROUND OF THE INVENTION

It is known to employ sources of illumination on tools of various types, including portable drills. Representative arrangements are illustrated in the following: U.S. Pat. No. 5,445,479, issued Aug. 29, 1995, U.S. Pat. No. 5,169,225, issued Dec. 8, 1992, U.S. Pat. No. 4,973,205, issued Nov. 27, 1990, U.S. Pat. No. 5,683,171, issued Nov. 4, 1997, U.S. Pat. No. 5,573,329, issued Nov. 12, 1996, U.S. Pat. No. 6,186,683, issued Feb. 13, 2001, U.S. Pat. No. 5,797,670, issued Aug. 25, 1998, and U.S. Patent Application Publication No. 2002/0105797, Published Aug. 8, 2002.

It is also known in the prior art to incorporate caddies with electric drills for holding drill bits or other articles. Representative arrangements of this type are disclosed in the following: U.S. Pat. No. 6,401,253, issued Jun. 11, 2002, U.S. Pat. No. 4,508,221, issued Apr. 2, 1985, U.S. Pat. No. 5,056,661, issued Oct. 15, 1991, and U.S. Pat. No. 6,364,580, issued Apr. 2, 2002.

A number of the devices referenced above are incorporated in the tool itself while others are attached to the tool subsequent to manufacture of the tool i.e. retrofitted to the tool.

With respect to electric drills, the light or drill bit caddy are often suitable for use with only one type or configuration of electric drill. Furthermore, such devices can be relatively bulky and/or awkward to use. Typically, devices employed to direct light to the workpiece and tool caddies for holding drill bits and other objects are dedicated to their one particular task and are not suitable for both providing light and functioning as a holder for objects such as tool bits.

DISCLOSURE OF INVENTION

The present invention relates to apparatus for releasably attachment to the housing of an electric drill for lighting an object being drilled by the electric drill and for holding drill and screw bits for use with the electric drill. The apparatus is characterized by its ease of use and adaptability for use with different sizes and shapes of drills, the apparatus incorporating a number of adjustable components adding to the utility thereof. The apparatus may be quickly installed on a housing of a plug-in or cordless electric drill or removed therefrom. The apparatus allows the user to adjust the light to accommodate the size and shape of the electric drill with which it is employed as well as the location of a workpiece relative to the drill, despite the compact nature of the apparatus.

The apparatus includes a base member having opposed base member ends. Releasable structure is provided for releasably attaching the base member to an electric drill housing.

The apparatus also includes a battery powered flashlight and an adjustable flashlight mount located at one of the opposed base member ends adjustably supporting the flashlight and allowing selective movement of the flashlight relative to the base member.

The apparatus additionally comprises a bit holder and an adjustable bit holder mount located on the other of the opposed base member ends supporting the bit holder and allowing selective movement of the bit holder to alternative positions relative to the base member.

Other features, advantages and objects of the present invention will become apparent with reference to the following description and accompanying drawings.

BEST MODE FOR CARRYING OUT THE INVENTION

Figure 1:
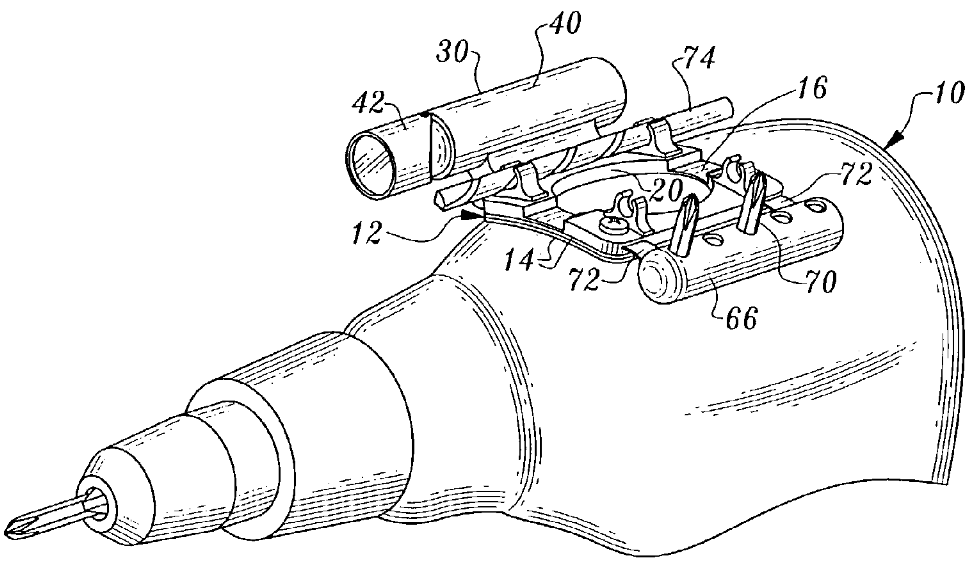
FIG. 1 is a frontal, perspective view of apparatus constructed in accordance with the teachings of the present invention attached to the housing of an electric drill, only of a portion of the latter being illustrated.
Figure 3:
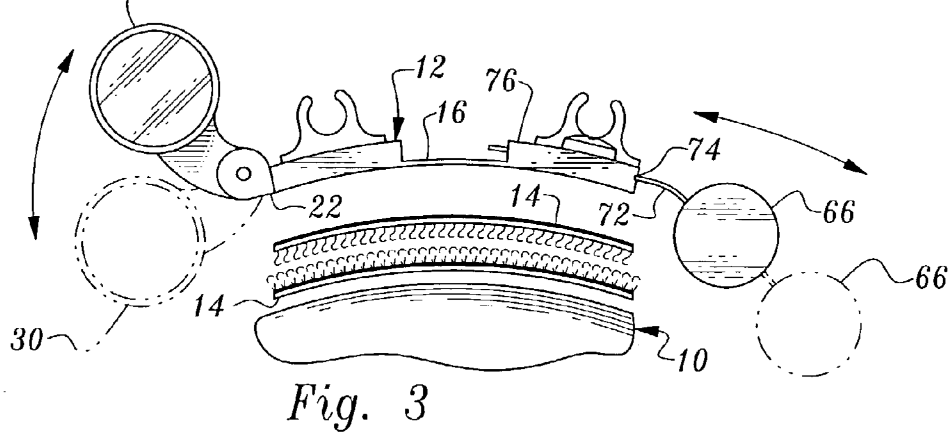
FIG. 3 is a rear, elevational view of the apparatus along with a portion of the top of the electric drill housing and attachment strips utilized to releasably attach the apparatus to the housing, the apparatus, housing and attachment strips being shown separated from one another for illustrative purposes.
Figure 4:
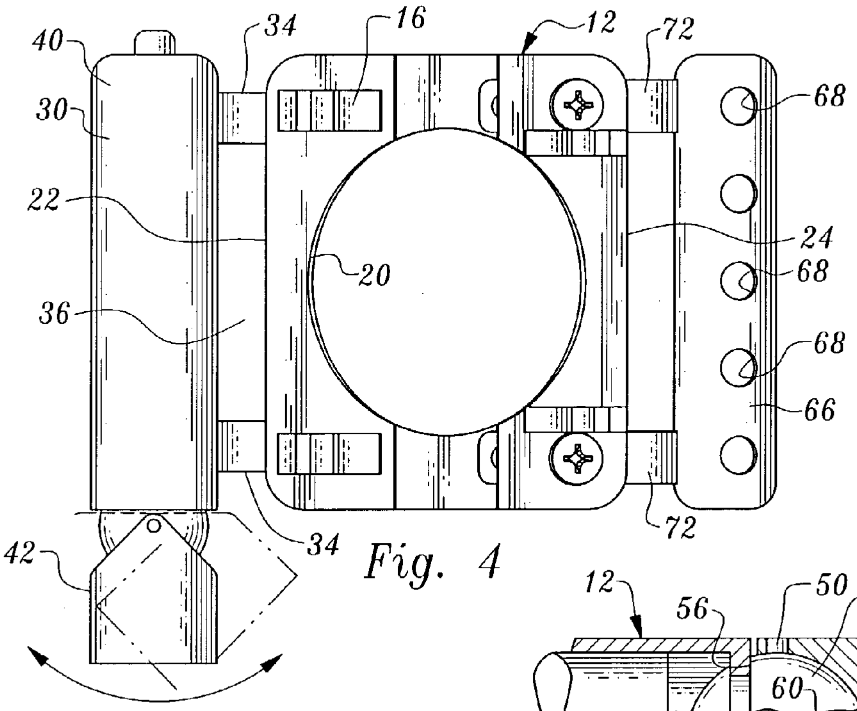
FIG. 4 is a top, plan view of the apparatus.

Referring now to the drawings, FIGS. 1 and 3 show a portion of an electric drill including housing 10 which is curved or rounded at the top, as illustrated.

In FIG. 1, apparatus 12 constructed in accordance with the teachings of the present invention is releasably attached to the top of the housing by strips of releasably engageable synthetic hook and eye fastener strips 14 on the apparatus and on the drill housing. More particularly, one of the strips is affixed to a base member 16 of the apparatus which may be formed of any suitable material such as plastic or spring metal.

Figure 2:
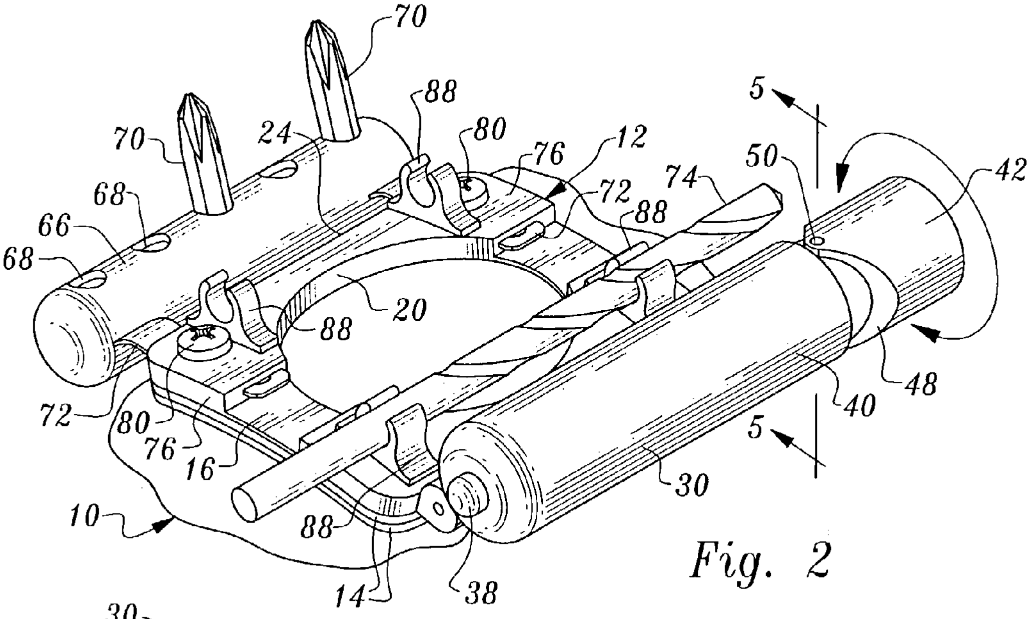
FIG. 2 is a top, perspective view as taken from the rear of the apparatus.
Figure 6:
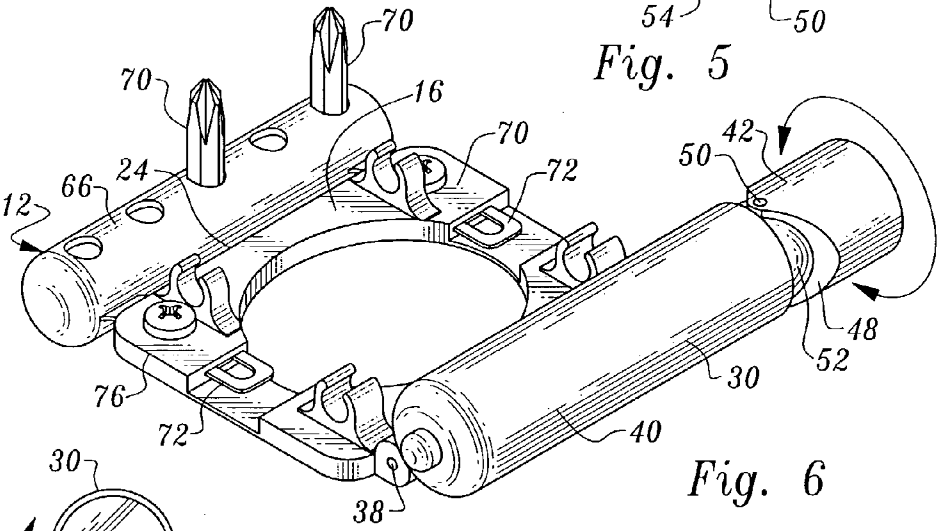
FIG. 6 is a view similar to FIG. 2, but illustrating the base member of the apparatus in a flat condition rather than the curved condition shown in FIG. 2.
Figure 7:
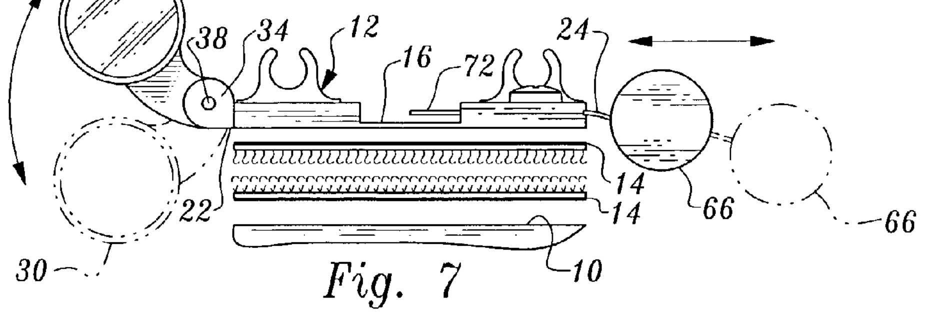
FIG. 7 is a view similar to FIG. 3, but illustrating the condition of the apparatus and attachment strips prior to attachment thereof to a flat drill housing, as compared to the curved housing illustrated in FIG. 3.

Base member 16 is flexible so that the apparatus 12 can be bent as shown in FIGS. 1–3 to conform to the curved shape of the housing. By way of contrast, FIGS. 6 and 7 show the base member 16 in straight condition so that it will conform to the straight shape of an alternative form of drill housing 10A. These housing shapes are for illustration purposes only, it being appreciated that the base member can be bent to conform to a variety of electric drill housing shapes and sizes.

Base member 16 defines an opening 20, it being understood that the fastener strips are configured so as not to underlie the opening 20. Opening 20 is for the purpose of accommodating on/off and/or high/low switches (not shown) or other protruding portions of the electric drill to which the apparatus is attached so that such protruding structure will not interfere with stable placement of the apparatus on the drill.

Base member 16 has opposed ends 22, 24. At end 22 is located an adjustable flashlight mount supporting a battery powered flashlight 30. More particularly, the flashlight mount comprises two lugs 34 rigidly affixed to the base member and extending outwardly from end 34 and a cylindrical member 36 disposed between the lugs and pivotal about a pivot axis extending along the base member. A hinge pin 38 interconnects the elements 34 and 36. FIGS. 3 and 7 show two possible alternate positions of flashlight 30 which may be obtained, one position above the level of the base member and another (shown in phantom line) disclosed below the level of the base member. Sufficient friction exists between the flashlight mount structural components to maintain the flashlight at the desired location until manual force sufficient to effect pivoting about the pivot axis is applied. This allows movement of the flashlight to adjust for tight conditions or to further "fine tune" the flashlight to concentrate illumination at a desired position.

The flashlight 30 includes a flashlight body 40 and a flashlight head 42. Disposed within flashlight head 42 is a light bulb 44, a reflector 46 including a bulb socket, and a lens element 48.

An important aspect of the present invention is that not only can the flashlight be moved relative to the base member, the flashlight head 42 can be moved or pivoted relative to the flashlight body so that light can be made to fall on a workpiece regardless of the size or shape of the electric drill with which the apparatus is employed.

Figure 5:
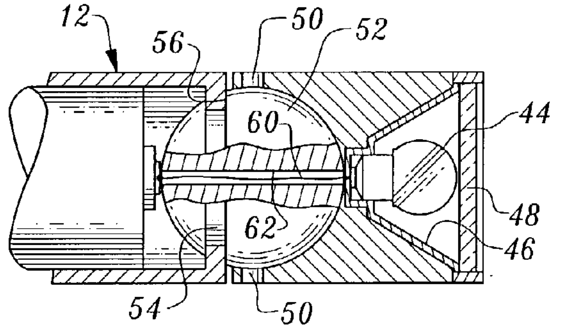
FIG. 5 is an enlarged cross-sectional view taken along the line 5—5 in FIG. 2.

In particular, notches 48 on opposed sides of the flashlight head provide adequate clearance between the flashlight head and the flashlight body to permit this action. Pins 50 secure the flashlight head to a ball or sphere-like element 52, the ball having a groove 54 formed therein receiving a flange 56 of the flashlight to maintain the ball in position. The flashlight head 42 can pivot as shown by the double-headed arrow in FIGS. 2 and 6 back and forth and in a plane orthogonal to the pivot of flashlight relative to the base member. Any suitable electrical connection can be provided to cause illumination of bulb or lamp 44 by battery 58. In the arrangement shown in FIG. 5, wires 60 passing through a hollow channel 62 in ball 52 serves that purpose.

Located adjacent to base member end 24 is a cylindrically-shaped screw bit holder 66 having openings 68 formed therein used to accommodate screw bits such as screw bits 70 illustrated in FIGS. 2 and 6.

An adjustable screw bit holder mount is provided at base member end 24 to support the screw bit holder and allow for selective movement of the screw bit holder to alternative positions relative to the base member. Representative positions are illustrated by the solid and phantom line depictions of the screw bit holder in FIGS. 3 and 7.

The adjustable mount for the screw bit holder includes two elongated mount elements 72 which are affixed to and extend from the screw bit holder. Receptacles 76 are formed by the base member and define passageways slidably receiving the mount elements 72. Lock screws 80 are utilized to lock the elongated mount elements against slidable movement relative to the receptacles. The lock screws may be unscrewed to permit the distance between the base member and the screw bit holder to be adjusted.

In the arrangement illustrated, two additional holders each including two holder elements 88 extend upwardly from the base member to accommodate drill bits, such as the single drill bit 70 shown in FIGS. 2 and 6.

What is claimed is:

1. Apparatus for releasable attachment to an electric drill housing for lighting an object being drilled by an electric drill and for holding bits for use with the electric drill, said apparatus comprising, in combination:

a base member having opposed base member ends;

releasable attachment structure for releasably attaching said base member to the electric drill housing;

a battery powered flashlight;

an adjustable flashlight mount located at one of said opposed base member ends adjustably supporting said flashlight and allowing selective movement of said flashlight between alternative positions relative to said base member;

a bit holder; and an adjustable bit holder mount located at the other of said opposed base member ends adjustably supporting said bit holder and allowing selective movement of said bit holder between alternative positions relative to said base member.

2. The apparatus according to claim 1 wherein said base member is flexible between said flashlight mount and said bit holder mount allowing bending of said base member whereby said base member conforms to the shape of the electric drill housing.

3. The apparatus according to claim 1 wherein said releasable attachment structure comprises releasably engageable synthetic hook and eye fastener material on said base member and on said electric drill housing.

4. The apparatus according to claim 1 wherein said bit holder mount comprises at least one elongated mount element affixed to and extending from said bit holder and a receptacle attached to said base member slidably receiving said at least one elongated mount element.

5. The apparatus according to claim 4 additionally comprising a lock for selectively locking said elongated mount element against slidable movement relative to said receptacle.

6. Apparatus for releasable attachment to an electric drill housing for lighting an object being drilled by an electric drill and for holding bits for use with the electric drill, said apparatus comprising, in combination:

a base member having opposed base member ends;

releasable attachment structure for releasably attaching said base member to the electric drill housing;

a battery powered flashlight; and an adjustable flashlight mount located at one of said opposed base member ends adjustably supporting said flashlight and allowing selective movement of said flashlight between alternative positions relative to said base member, said battery powered flashlight including a flashlight body and a flashlight head, said flashlight head being pivotal relative to said flashlight body.

7. The apparatus according to claim 6 wherein said flashlight mount comprises first mount structure rigidly affixed to said base member and second mount structure pivotally connected to said first mount structure and pivotal about a pivot axis extending along the base member end where said flashlight mount is located, said flashlight being selectively movable between positions above the level of said base member and below the level of said base member.

8. Apparatus for releasable attachment to an electric drill housing for lighting an object being drilled by an electric drill and for holding bits for use with the electric drill, said apparatus comprising, in combination:

a base member having opposed base member ends;

releasable attachment structure for releasably attaching said base member to the electric drill housing;

a battery powered flashlight; and an adjustable flashlight mount located at one of said opposed base member ends adjustably supporting said flashlight and allowing selective movement of said flashlight between alternative positions relative to said base member, said base member defining an opening for accommodating a switch or other protruding portion of the electric drill.

* * * * *